Patented Nov. 7, 1939

2,179,457

UNITED STATES PATENT OFFICE 2,179,457

MANUFACTURE OF SALTS OF CELLULOSE ETHER CARBOXYLIC ACIDS

Julius Voss, Wiesbaden-Biebrich, Germany, assignor to Kalle & Co. Aktiengesellschaft, Wiesbaden-Biebrich, Germany No Drawing. Application November 16, 1937, Serial No. 174,826. In Germany November 21, 1936

1 Claim. (Cl. 260—231)

By the reaction of cellulose or cellulosic materials with the salts of halogen fatty acids in presence of sodium hydroxide in aqueous or aqueous-alcoholic solution salts of cellulose ether carboxylic acids are obtained from which the corresponding acids may be obtained by means of mineral acids. The cellulose ether carboxylic acids or their salts find application for various technical purposes, for example as dressing agents, thickening agents, adhesives or the like.

An object of the invention is a particularly satisfactory process for making salts of cellulose ether carboxylic acids soluble in water.

The invention is based on the observation that in the manufacture of the salts of cellulose ether carboxylic acids by the reaction of cellulose with a halogen fatty acid in presence of sodium hydroxide it is advantageous to add to the mixture a salt which impedes the hydrolysis of the alkali cellulose. There may be used for the purpose various water-soluble salts which are chemically indifferent, that is to say do not react either with the alkali cellulose or with the halogen fatty acid. Sodium chloride is to be preferred. Next to this come sodium bromide and the sodium salts of various organic acids, for instance sodium formate, sodium acetate, sodium benzoate and sodium lactate. Sodium nitrate can also be used with success. Such a salt may be added to the mixture undergoing reaction in such a proportion that the salt is present to the extent of 20–80 per cent of the cellulose for example. Considerably larger proportions may be used, but this is not necessary. It is recommended that the salt be added when the alkali cellulose has been formed. For making the alkali cellulose the cellulose is immersed in a soda lye of 15–40 per cent strength, preferably a lye of 20–25 per cent strength.

The proportion of halogen fatty acid to be used depends to a certain extent on the condition of the alkali cellulose. The riper the alkali cellulose and the more reactive the cellulose which is used, the smaller the proportion of halogen fatty acid required.

There is used about 1–1.5 mol of halogen fatty acid to 1 mol of cellulose ($C_6H_{10}O_5$). The alkali used should preferably be about 3–4 mol per 1 mol of cellulose. The term alkali here includes the total alkali, that is to say that combined with the halogen fatty acid, that combined with the cellulose and the free alkali in the mixture.

Compared with the process which operates without the addition of a salt of the kind hereinbefore named, the new process has essential advantages. Thus, for obtaining by this process salts of ether carboxylic acids slightly and completely soluble in water or an aqueous alkali, smaller proportions of the halogen fatty acids used as etherifying agents are necessary than in the case of the old process. Moreover, the products obtained by the new procedure have important technical properties, for example, the solution of the water-soluble products obtained by the invention are in general very thixotropic. This property is very desirable. Above all, the products are characterized by the fact that they yield by precipitation with acids the cellulose ether carboxylic acids in higher yield and in a form more easily to be washed and filtered than is the case with the known products.

The halogen acetic acids are the best for the purpose of the invention, in particular chloracetic acid, bromacetic acid may be used, if desired, also homologues of these acids may be used, for example chloropropionic acid.

The following examples illustrate the invention:

(1) Into 1000 grams of alkali cellulose containing 14.5 per cent of sodium hydroxide and 33.5 per cent of cellulose 200 grams of sodium chloride are stirred. After stirring for ½ hour there is added a solution of 100 grams of monochloracetic acid in 140 cc. of water, which solution has been neutralised by sodium bicarbonate; the whole is then stirred for 1 hour at a temperature of 35° C. There are then added 50 cc. of caustic soda lye of 50 per cent strength and stirring is continued for ½ hour at 35° C. There is then added a further solution, neutralised with sodium bicarbonate, of 90 grams of monochloracetic acid in 140 cc. of water, and stirring is maintained for 3 hours at 35° C. Should the reaction be still incomplete after this period, it is recommended that the mass should be heated for some time at 40° C. or allowed to remain over night at ordinary temperature. After extracting the mass with alcohol of 80 per cent strength which contains acetic acid for the purpose of neutralising the alkali there remains the sodium salt of cellulose glycollic acid free from sodium chloride and soluble in water to a clear neutral solution. For separating the cellulose glycollic acid from this salt the latter is treated for a short time with 4.5 litres of a solution heated to about 70° C. and containing about 12 per cent of common salt and about 2 per cent of hydrochloric acid. The precipitated cellulose glycollic acid may easily be filtered.

(2) 1000 grams of alkali cellulose of the composition prescribed in Example 1 are stirred with 200 grams of sodium formate for 30 minutes; there is then added gradually a solution of 120 grams of monochloracetic acid in 180 cc. of water, which solution has been neutralised with sodium bicarbonate. After stirring for an hour, there follows an addition of 50 cc. of concentrated caustic soda lye and stirring is continued for another 30 minutes. Finally, another 90 grams of monochloracetic acid dissolved in 160 cc. of water and neutralised are added. The mass is then kept while stirring for 3 hours at 35° C. and then for one hour at 40° C. After it has been extracted with aqueous alcohol there remain 410 grams of a sodium salt of cellulose glycollic acid free from impurities. If pure cellulose glycollic acid is required, the mass is preferably mixed directly with hydrochloric acid solution containing common salt. In this manner 377 grams of cellulose glycollic acid may be obtained.

(3) 1 kilo of alkali cellulose containing about 15 per cent of sodium hydroxide and 32 per cent of cellulose which has been allowed to ripen for 12 hours at normal temperature is mixed with 200 grams of sodium bromide and thoroughly stirred therewith. After about one hour's stirring, a solution neutralised with sodium carbonate of 100 grams of monochloracetic acid in 220 cc. of water is added and the whole is further stirred for one hour at 35° C. After addition of 50 cc. of concentrated caustic soda lye the mass is further stirred for ½ hour at the same temperature and then there is added a neutralised solution of 100 grams of monochloracetic acid in 160 cc. of water. The mass is now stirred for 3 hours at 40° C. By addition of dilute acetic acid the excess of alkali is neutralised. After washing out the halogen salt with aqueous alcohol there are obtained 360 grams of a sodium salt of cellulose glycollic acid which dissolves smoothly in water to a solution of high viscosity.

I claim:

The process which comprises causing to react 1 mol of cellulose with about 1–1.5 mols of a halogen fatty acid in the presence of about 3–4 mols of sodium hydroxide with addition of a chemically indifferent sodium salt.

JULIUS VOSS.